No. 716,355. Patented Dec. 16, 1902.
H. H. WAIT.
METHOD OF REGULATING MULTICIRCUIT GENERATORS.
(Application filed May 5, 1902.)
(No Model.)

Witnesses:
Harold G. Barrett
W. H. Leach

Inventor.
Henry H. Wait.
By Barton
Atty

UNITED STATES PATENT OFFICE.

HENRY H. WAIT, OF CHICAGO, ILLINOIS, ASSIGNOR TO WESTERN ELECTRIC COMPANY, OF CHICAGO, ILLINOIS, A CORPORATION OF ILLINOIS.

METHOD OF REGULATING MULTICIRCUIT-GENERATORS.

SPECIFICATION forming part of Letters Patent No. 716,355, dated December 16, 1902.

Application filed May 5, 1902. Serial No. 105,939. (No model.)

*To all whom it may concern:*

Be it known that I, HENRY H. WAIT, a citizen of the United States, residing at Chicago, in the county of Cook and State of Illinois, have invented a certain new and useful Improvement in Methods of Regulating Multicircuit-Generators, (Case No. 17,) of which the following is a full, clear, concise, and exact description.

My invention relates to a method of regulating electric generators of the multicircuit type—that is, where two or more working circuits, such as series arc-lamp circuits, are supplied from different sets of brushes which take current from a single armature. It will be seen that in an arc-machine where the armature necessarily has a very high reaction a movement of the brushes supplying one circuit to compensate for a change of load in that circuit will change the circumferential distance on the commutator between these brushes and the brushes belonging to the other circuit, so that if constant current is maintained the armature reaction will be varied, causing a variation in the intensity and distribution of the magnetic flux threading the coils undergoing commutation. The result will be that this change in the reversing-field acting on the coils undergoing commutation will cause a variation in the current flowing through these short-circuited coils, such that serious and destructive sparking may be produced.

My invention has for its object more particularly to prevent such sparking as the brushes of one circuit are shifted to compensate for change of load; and it consists, briefly, in maintaining the currents in the coils undergoing commutation at their proper predetermined values by varying the components which go to produce such currents—that is, by varying the ampere-turns on the field-poles or varying the number of turns of the armature-winding which are short-circuited by the brushes—in proportion to the changes caused by the unequal distribution of the armature reaction. The preferred method of doing this is to vary the span of each brush to increase or diminish the number of turns of the armature-winding short-circuited thereby in inverse ratio to the change in magnetic flux threading the short-circuited coils as the brushes of one circuit or the other are shifted.

I will describe my invention by reference to the accompanying drawings, in which—

Figure 1:
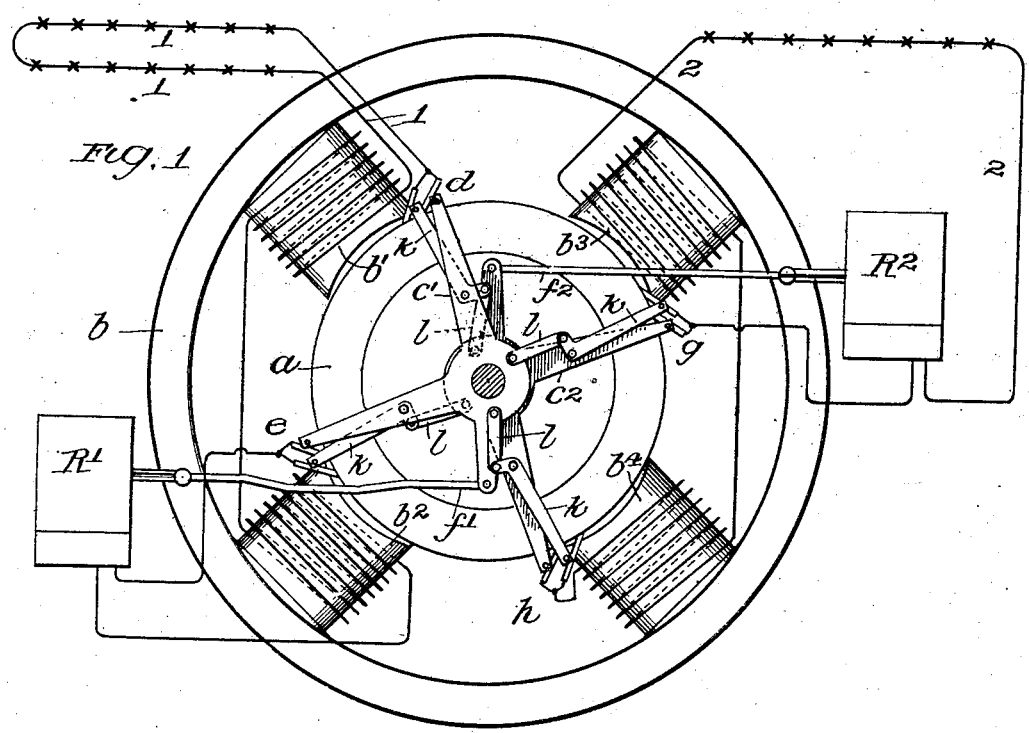
Figure 2:
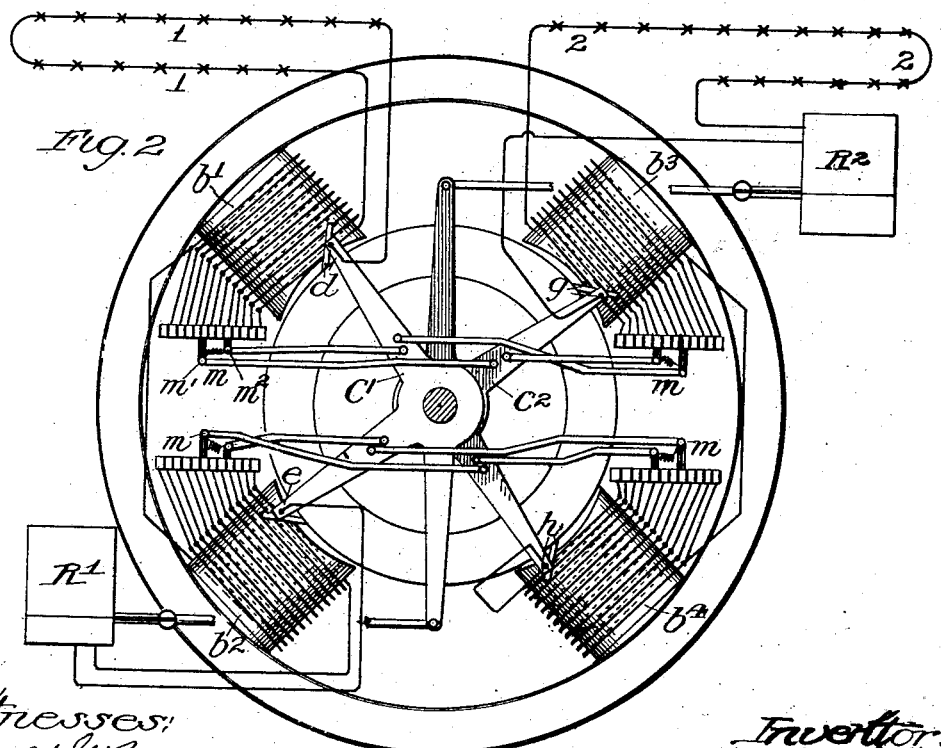

Figure 1 is a diagram illustrating a multipolar generator with two pairs of brushes, each pair supplying an individual circuit, the machine being constructed so that the span of each of the four brushes will be varied when either pair of brushes is shifted independently of the other pair to compensate for change of load on the corresponding circuit. Fig. 2 is a similar diagram illustrating a modification of my invention, in which the current in the coils undergoing commutation is maintained practically constant under changes of armature reaction by varying the ampere-turns on the field to compensate for such changes instead of by varying the other component going to produce such commutation-current—that is, the number of turns of armature-winding which are short-circuited by the brushes.

The same characters of reference are used to designate the same parts in both figures.

Referring first to Fig. 1, the armature $a$ is arranged to rotate within the influence of the field-magnet $b$, which is provided with four poles $b'$ $b^2$ $b^3$ $b^4$. Two pairs of brushes are provided for taking the current from said armature, said pairs of brushes being carried by the independently-movable rocker-arms $c'$ $c^2$. The rocker-arm $c'$, which carries the pair of brushes $d$ $e$, is arranged to be swung about its axis by the regulating device $R'$ to shift the position of the brushes as the load on the circuit 1, supplied from said brushes, is varied, the regulating device $R'$ being mechanically connected with the rocker-arm $c'$ by the link $f'$. Similarly the rocker-arm $c^2$ is connected by a link $f^2$ with the regulating device $R^2$, whereby the other pair of brushes $g$ $h$, supplying the other circuit 2, is shifted in accordance with the change of load on the latter circuit. Such regulating devices are well known in the art and need no particular description. Each brush consists of a stationary member fixed upon an arm of the rocker and a movable member carried by a lever $k$, pivoted so that the movable member of the brush may be moved closer to or farther from the stationary member thereof by rocking said lever $k$ about its pivot, whereby the span of the brush may be adjusted to increase or decrease the number of turns of the armature-winding short-circuited thereby. The levers $k$ $k$ of each rocker are connected by links $l$ $l$ with the other rocker, so that when either rocker is moved independently of the other the several arms $k$ $k$ will be moved about their pivots to change the span of the brushes. The levers and links are pivoted and arranged so that when either rocker-arm is shifted in a direction to bring the brushes $d$ and $g$ or the brushes $e$ and $h$ toward one another the span of each of the two brushes which approach each other will be decreased, while the span of each of the other brushes will be increased. The operation of this machine is as follows: The rockers $c'$ $c^2$ are both shown in the positions they would occupy with full load on both the circuits 1 2. Assume now that the load on the circuit 2 is decreased, as by cutting out some of the arc-lamps which are connected in series in such circuit. The regulator $R^2$ will immediately act to maintain the current constant by shifting the rocker-arm $c^2$ to move the brushes $g$ and $h$ from the position shown to positions nearer the center of the pole-pieces $b^4$ and $b^0$, respectively. The brushes $d$ and $g$ will thus be brought nearer together, while the brushes $e$ and $h$ will be separated, the result being that the number of turns on the armature between brushes $d$ and $g$ is decreased, while the number of turns between the brushes $e$ and $h$ is increased. The reactive ampere-turns on the armature between brushes $d$ and $g$—that is, between pole-pieces $b'$ and $b^3$—being thus diminished a change in the distribution of the field magnetism will result, the magnetic flux from pole-pieces $b'$ and $b^3$ being considerably increased. Brushes $e$ and $h$ being moved apart the magnetic flux from pole-pieces $b^2$ and $b^4$ is decreased. Sparking would now result owing to the change in the "reversing-fields" at the several brushes—that is, the change in the magnetic forces which go to build up currents in the coils undergoing commutation. In accordance with my invention, however, the currents in the coils undergoing commutation are maintained at their proper predetermined values by varying the net magnetizing force acting on said coils to compensate for the unequal distribution of the armature reaction, and in the arrangement of Fig. 1 this is done by varying the number of turns of armature-winding which are short-circuited by the brushes— that is, by varying the number of turns which generate the electromotive force required to build up the commutation-current in the short-circuited coils. The magnetic flux from pole-pieces $b'$ and $b^3$ being increased the movable members of the brushes $d$ and $g$ are moved toward the stationary members of said brushes by the lever mechanism as the rocker-arm $c^2$ is shifted to the left, so that a less number of the armature-coils is short-circuited by the brushes $d$ and $g$ to compensate for the increase in the magnetic flux which threads the coils undergoing commutation at said brushes, so that the currents built up in the short-circuited coils are maintained at their proper predetermined values. Similarly when either of the two brushes $d$ and $g$ or $e$ and $h$ are separated, as would be the case with brushes $e$ and $h$ when the rocker-arm $c^2$ is moved toward the no-load position, the lever mechanism will act to bring the movable members of said brushes away from the fixed members thereof, thus increasing the span of the brushes to compensate for the decrease in magnetism threading the coils spanned thereby.

Referring now to Fig. 2, no means are shown for varying the span of the brushes; but in place thereof switches $m$ $m$ are provided for short-circuiting portions of the winding on the several field-magnet poles, these switches being controlled jointly by the two rocker-arms $c'$ $c^2$, which carry the two sets of brushes. Each field-magnet has associated therewith a switch consisting of a strip of contacts connected with different points on the field-winding, and two brushes $m'$ $m^2$, which are electrically connected together, are arranged to slide along each strip of contact-pieces. The number of ampere-turns on any field-pole may thus be changed by moving the two brushes of its switch toward or away from one another to vary the portion of the field-magnet short-circuited by said brushes. The brushes $m'$ $m^2$ of each switch are connected by links with the rocker-arms $c'$ $c^2$, respectively, so that as either rocker-arm is moved it will change the positions of the brushes $m'$ $m^2$ of all the switches. When the movement of the rocker-arms is in a direction to bring the collecting-brushes $d$ and $g$ nearer together, it will be seen that the decrease in the armature reaction between these brushes will be compensated for by the separation of the two brushes $m'$ $m^2$ of the switches which control the field-magnets $b'$ and $b^3$, respectively, thus decreasing the ampere-turns on these two poles. Similarly a movement of the rocker-arms to bring brushes $e$ and $h$ nearer together will result in weakening the field strength of poles $b^2$ and $b^4$. A movement of either of the two brushes $d$ and $g$ or $e$ and $h$ away from each other will bring about a strengthening of the corresponding field-poles to compensate for the increase in armature reaction between them.

I do not wish to limit my invention to the exact form of multicircuit-machine shown in the drawings, but wish to include any form of generator in which two or more individual circuits are supplied from different sets of brushes on the same armature.

In another application, Serial No. 105,940, filed May 5, 1902, I have described and claimed a regulating mechanism for varying the span of the individual brushes as either set of brushes is shifted; but in the present application

I claim—

1. The herein-described method of preventing undue sparking in multicircuit-generators under conditions of unequal load on the different circuits, which consists in maintaining the electromotive forces in the short-circuited coils at their proper values by varying the components which produce these electromotive forces, to compensate for the changes caused by the unequal distribution of the armature reaction.

2. The herein-described method of regulating multicircuit-generators to prevent undue sparking, which consists in varying the number of turns of the armature-winding which are short-circuited in commutation, according to the increase or decrease of the magnetic flux threading such portions of the armature caused by the change of armature reaction which results from shifting the brushes of one circuit independent of the other to compensate for change of load.

In witness whereof I hereunto subscribe my name this 2d day of May, A. D. 1902.

HENRY H. WAIT.

Witnesses:
DE WITT C. TANNER,
W. W. LEACH.